(12) United States Patent
Damgaard et al.

(10) Patent No.: US 9,284,889 B2
(45) Date of Patent: Mar. 15, 2016

(54) FLEXIBLE SEAL SYSTEM FOR A GAS TURBINE ENGINE

(75) Inventors: Jocelyn C. Damgaard, Vernon, CT (US); Steven D. Roberts, Moodus, CT (US); Timothy Dale, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 614 days.

(21) Appl. No.: 13/297,458

(22) Filed: Nov. 16, 2011

(65) Prior Publication Data

US 2013/0121813 A1 May 16, 2013

(51) Int. Cl.
*F02C 7/28* (2006.01)
*F02K 1/80* (2006.01)

(52) U.S. Cl.
CPC . *F02C 7/28* (2013.01); *F02K 1/805* (2013.01); F05D 2250/611 (2013.01)

(58) Field of Classification Search
CPC ........ F01D 25/24; F01D 25/243; F16J 15/52; F05D 2240/55; F05D 2250/72; F05D 2250/611; F05D 2260/30; F02C 7/20; F02C 7/28; F02K 1/805
USPC ........... 415/126–128, 134, 135, 213.1, 214.1, 415/220; 277/634–636; 60/39.5, 232, 770, 60/771
See application file for complete search history.

(56) References Cited

U.S. PATENT DOCUMENTS

| | | | |
|---|---|---|---|
| 2,886,885 A * | 5/1959 | Reid, Jr. | 29/421.1 |
| 3,358,440 A * | 12/1967 | Freid | 60/791 |
| 3,469,862 A * | 9/1969 | Conibeer | 285/41 |
| 3,561,793 A * | 2/1971 | Rode | 285/13 |
| 5,584,511 A | 12/1996 | Gonzalez et al. | |
| 5,702,214 A | 12/1997 | Duran | |
| 5,848,874 A * | 12/1998 | Heumann et al. | 415/189 |
| 6,065,756 A | 5/2000 | Eignor et al. | |
| 6,267,327 B1 | 7/2001 | Siefker | |
| 6,702,300 B1 | 3/2004 | Steinetz et al. | |
| 7,810,816 B1 | 10/2010 | Halling | |
| 7,984,911 B2 | 7/2011 | Dobek et al. | |
| 8,016,297 B2 | 9/2011 | Heinemann et al. | |
| 8,459,936 B2 * | 6/2013 | Damgaard et al. | 415/128 |
| 2004/0071548 A1 * | 4/2004 | Wilson, Jr. | 415/173.1 |
| 2008/0075555 A1 | 3/2008 | March et al. | |
| 2008/0185789 A1 * | 8/2008 | Kozlowski et al. | 277/315 |
| 2009/0140497 A1 | 6/2009 | Roberts et al. | |
| 2009/0212501 A1 | 8/2009 | Glahn et al. | |
| 2011/0236188 A1 | 9/2011 | Knapp et al. | |

* cited by examiner

*Primary Examiner* — Edward Look
*Assistant Examiner* — Danielle M Christensen
(74) *Attorney, Agent, or Firm* — O'Shea Getz P.C.

(57) ABSTRACT

A flexible seal system for a gas turbine engine includes an annular mounting bracket, an annular support bracket, an annular flexible seal and a plurality of mounting spacers. The flexible seal extends axially between a first mounting segment and a second mounting segment. The first mounting segment is connected axially between the mounting bracket and the support bracket, and includes a plurality of mounting apertures that extend axially through the first mounting segment. Each of the mounting spacers is arranged within a respective one of the mounting apertures, and extends axially between the mounting bracket and the support bracket.

11 Claims, 3 Drawing Sheets

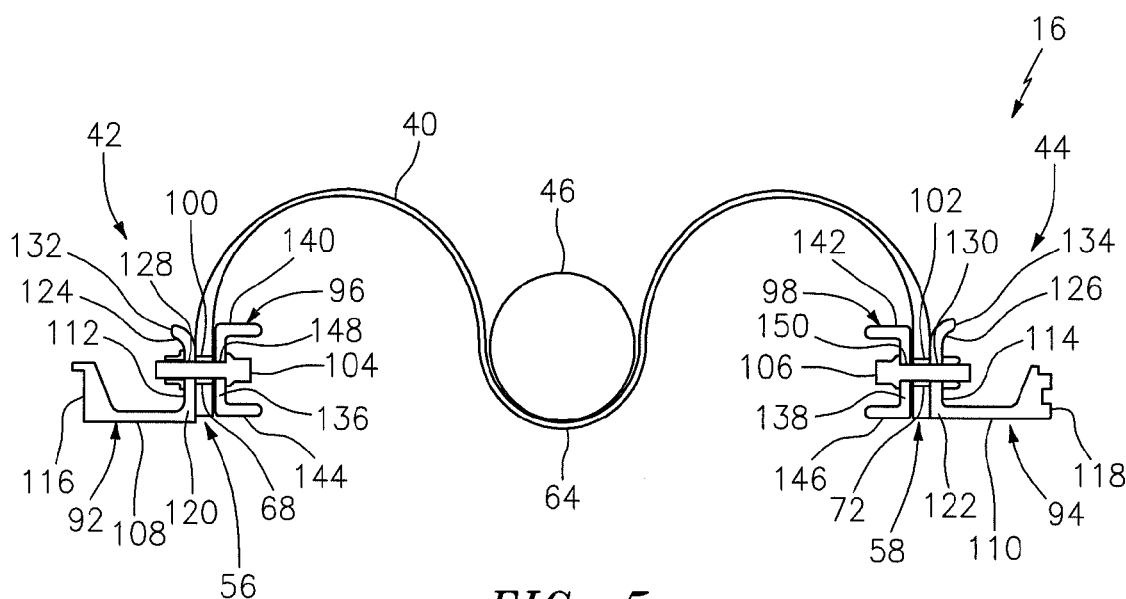
FIG. 5
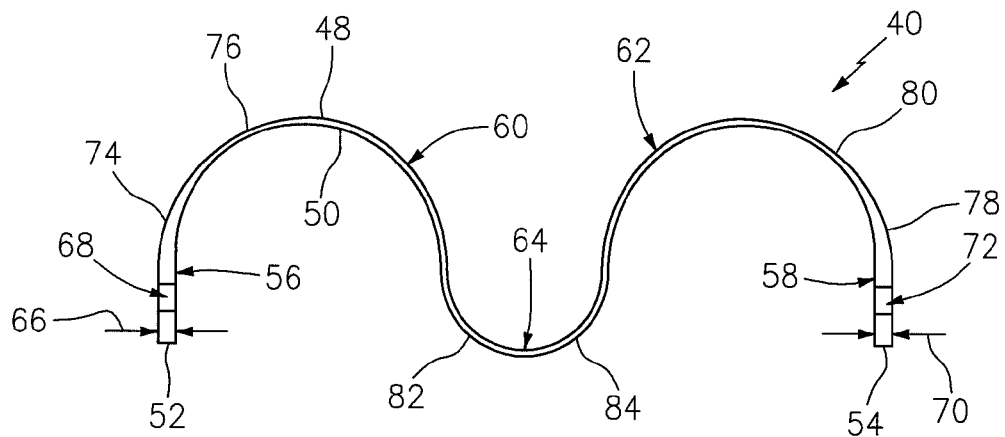
FIG. 6
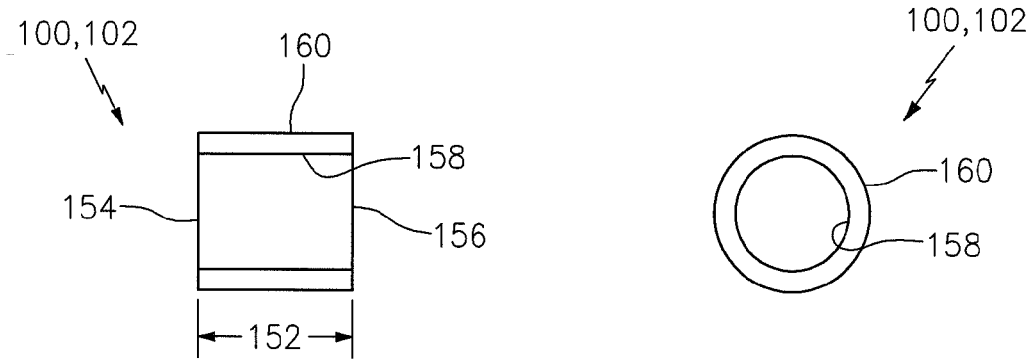
FIG. 8
FIG. 9

FLEXIBLE SEAL SYSTEM FOR A GAS TURBINE ENGINE

This invention was made with government support under Contract No. N00019-07-C-0055 awarded by the United States Navy. The government may have certain rights in the invention.

BACKGROUND OF THE INVENTION

1. Technical Field

The present invention relates to gas turbine engines and, in particular, to a flexible seal system that may be mounted between engine cases utilizing a plurality of mounting spacers.

2. Background Information

Various gas turbine engine configurations are known in the art. One such gas turbine engine configuration includes a flexible seal connected between an engine turbine section and an engine nozzle section. The flexible seal is designed to accommodate relative shifts between the turbine section and the nozzle section.

The flexible seal may include a first mounting flange and a second mounting flange and each mounting flange is compressed between two respective mounting plates. The mounting plates respectively secure the first and second mounting flanges to the turbine section and the nozzle section. Compressing the mounting flanges between the mounting plates to a predetermined compression value, however, may be difficult to achieve and repeat due to the compressible nature of the flexible seal material. The mounting flanges therefore are often over-compressed between the mounting plates during installation, which may cause damage to the flexible seal over several thermal cycles. Where the mounting flanges are under-compressed, however, air may leak between the mounting flanges and the mounting plates, which may reduce engine performance and efficiency.

SUMMARY OF THE DISCLOSURE

According to a first aspect of the invention, a flexible seal system for a gas turbine engine includes an annular mounting bracket, an annular support bracket, an annular flexible seal and a plurality of mounting spacers. The flexible seal extends axially between a first mounting segment and a second mounting segment. The first mounting segment is connected axially between the mounting bracket and the support bracket, and includes a plurality of mounting apertures that extend axially through the first mounting segment. Each of the mounting spacers is arranged within a respective one of the mounting apertures, and extends axially between the mounting bracket and the support bracket.

According to a second aspect of the invention, a gas turbine engine includes a flexible seal system that extends axially between a first engine case and a second engine case. The flexible seal system includes a mounting bracket that is connected to the first engine case, a support bracket, a flexible seal and a plurality of mounting spacers. The flexible seal extends axially between a first mounting segment and a second mounting segment. The first mounting segment is connected between the mounting bracket and the support bracket, and includes a plurality of mounting apertures that extend through the first mounting segment. The mounting spacers respectively extend through the first mounting apertures between the first mounting bracket and the first support bracket.

The foregoing features and the operation of the invention will become more apparent in light of the following description and the accompanying drawings.

BRIEF DESCRIPTION OF THE DRAWINGS

FIG. 5 is a cross-sectional illustration of the flexible seal system illustrated in FIG. 4;

FIG. 6 is a cross-sectional illustration of an annular flexible seal;

FIG. 8 is a cross-sectional illustration of a mounting spacer; and

FIG. 9 is a sectional illustration of the mounting spacer illustrated in FIG. 8.

DETAILED DESCRIPTION OF THE INVENTION

Figure 1:
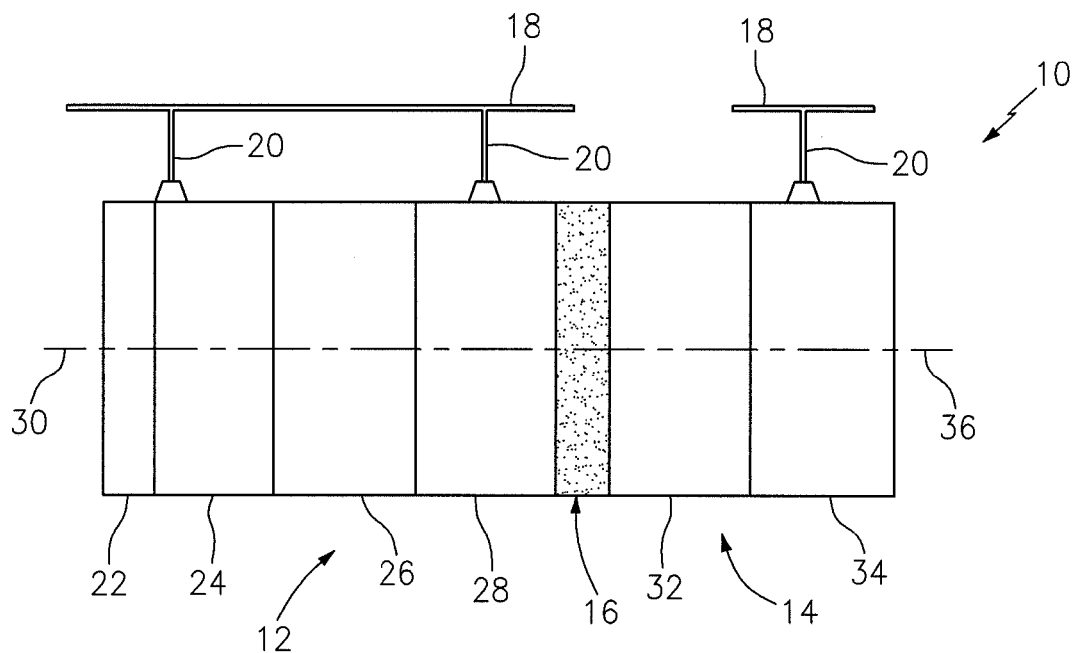
FIG. 1 is a simplified schematic illustration of a gas turbine engine in a first configuration.

FIG. 1 is a simplified schematic illustration of a gas turbine engine 10 in a first configuration (e.g., a non-deflected configuration). The engine 10 includes a first engine case 12, a second engine case 14 and an annular flexible seal system 16. The first engine case 12 and the second engine case 14 may be mounted to an airframe 18 by one or more respective engine mounts 20. The first engine case 12 may house a fan section 22, a compressor section 24, a combustor section 26 and/or a turbine section 28, which are sequentially arranged along a first engine axis 30. The second engine case 14 may house a nozzle duct 32 and/or an augmentor 34, which are sequentially arranged along a second engine axis 36. The flexible seal system 16 extends axially between the first engine case 12 and the second engine case 14.

Figure 2:
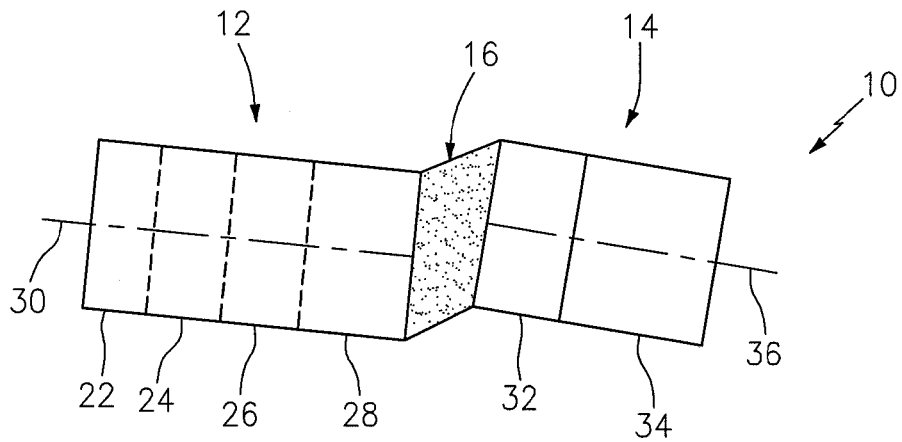
FIG. 2 is a simplified schematic illustration of a gas turbine engine in a second configuration.
Figure 3:
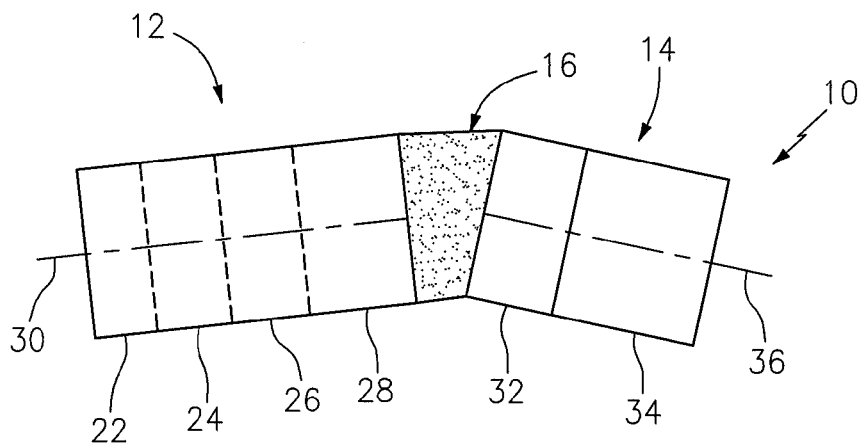
FIG. 3 is a simplified schematic illustration of a gas turbine engine in a third configuration.

FIG. 2 is a simplified schematic illustration of the engine 10 in a second configuration (e.g., a deflected configuration). FIG. 3 is a simplified schematic illustration of the engine 10 in a third configuration (e.g., another deflected configuration). Referring to FIGS. 2 and 3, the first engine case 12 and the second engine case 14 may shift (e.g., axially, transversely, angularly, etc.) relative to one another during certain operating conditions (e.g., during high impact landings, severe turbulence, etc.). The flexible seal system 16 may accommodate these shifts between the first engine case 12 and the second engine case 14, for example, without significant load transfer between the engine cases 12 and 14.

Figure 4:
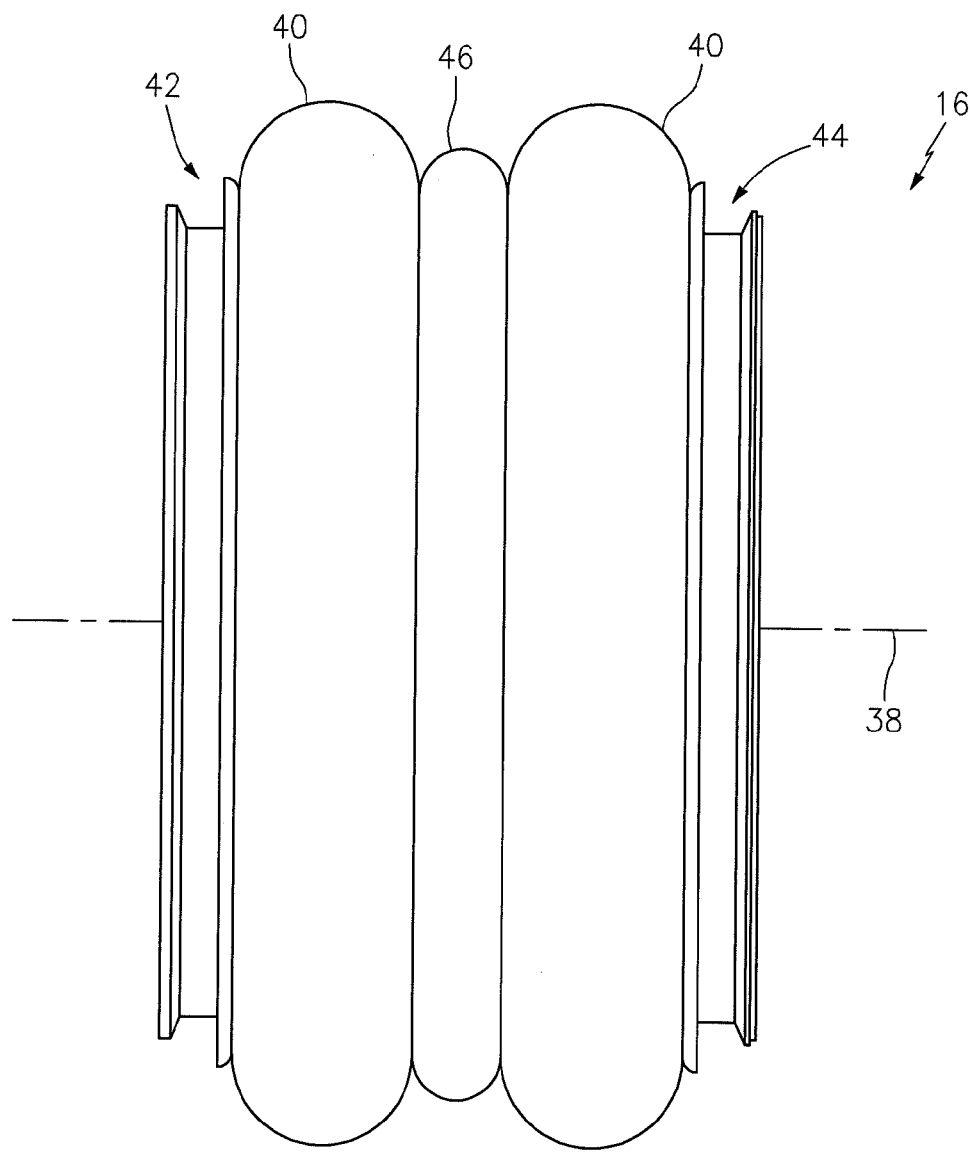
FIG. 4 is a side view illustration of an annular flexible seal system.

FIG. 4 is a side view illustration of the flexible seal system 16 extending along an axial centerline 38. FIG. 5 is a cross-sectional illustration of the flexible seal system 16. Referring to FIGS. 4 and 5, the flexible seal system 16 may include an annular flexible seal 40, a first seal mounting system 42, a second seal mounting system 44 and a reinforcement ring 46.

FIG. 6 is a cross-sectional illustration of the flexible seal 40. The flexible seal 40 has an exterior seal surface 48 and an interior seal surface 50, which extend axially between a first flexible seal end 52 and a second flexible seal end 54. The flexible seal 40 includes a first mounting segment 56, a second mounting segment 58 and one or more arcuate seal segments 60, 62 and 64 (e.g., semi-circular seal segments).

The first mounting segment 56 has a first thickness 66 that extends between the exterior seal surface 48 and the interior seal surface 50. The first mounting segment 56 extends radially from the first flexible seal end 52 to the seal segment 60. The first mounting segment 56 includes a plurality of first mounting apertures 68 that are arranged circumferentially around the axial centerline 38 (see FIG. 4). Each first mounting aperture 68 extends axially through the first mounting segment 56.

The second mounting segment 58 has a second thickness 70 that extends between the exterior seal surface 48 and the interior seal surface 50. The second mounting segment 58 extends radially from the second flexible seal end 54 to the seal segment 62. The second mounting segment 58 includes a plurality of second mounting apertures 72 that are arranged circumferentially around the axial centerline 38 (see FIG. 4). Each second mounting aperture 72 extends axially through the second mounting segment 58.

The seal segments may include a first seal segment 60, a second seal segment 62 and a third seal segment 64. The first seal segment 60 may include a transitional first region 74 that extends radially outward from the first mounting segment 56 to a second region 76. The first region 74 may have a thickness, which extends between the exterior seal surface 48 and the interior seal surface 50, that tapers as the first region 74 extends from the first mounting segment 56 to the second region 76. The second region 76 extends from the first region 74 to the third seal segment 64. The second seal segment 62 may include a transitional first region 78 that extends radially outward from the second mounting segment 58 to a second region 80. The first region 78 may have a thickness, which extends between the exterior seal surface 48 and the interior seal surface 50, that tapers as the first region 78 extends from the second mounting segment 58 to the second region 80. The second region 80 extends from the first region 78 to the third seal segment 64. The third seal segment 64 may include a first region 82 and a second region 84. The first region 82 may extend radially inward from the second region 76 to the second region 84. The second region 84 may extend radially inwards from the second region 80 to the first region 82.

Figure 7:
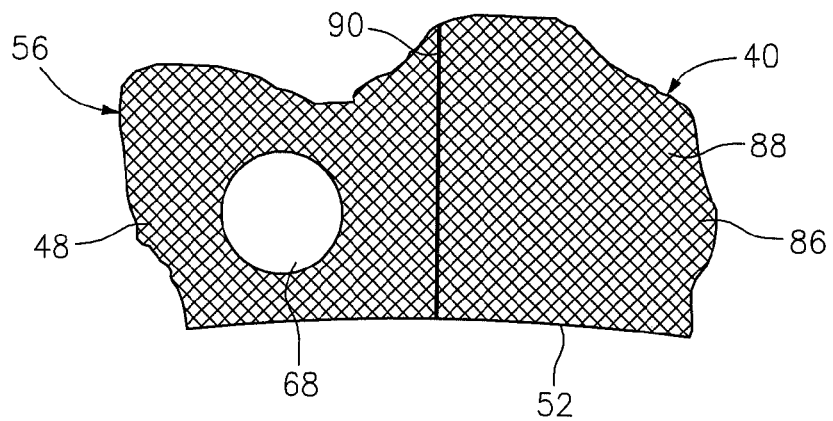
FIG. 7 is an enlarged portion of the flexible seal illustrated in FIG. 6.

FIG. 7 is an enlarged portion of the flexible seal 40. The flexible seal 40 may be constructed from an elastomer composite that includes for example a plurality of fibers 86 (e.g., woven glass fibers) disposed within an elastomer (e.g., resin) matrix 88. At least a quantity of the fibers 86 may be laid obliquely relative to a flexible seal contour line 90 that extends axially along the exterior seal surface 48 (see also FIG. 6). Alternatively, the flexible seal may be constructed from an elastomer composite as disclosed in U.S. application Ser. No. 11/947,814, which is hereby incorporated by reference in its entirety, and is assigned to the assignee of the present invention. One of ordinary skill in the art will appreciate that other elastomer composites, and other materials may be used for the flexible seal 40.

Referring again to FIG. 5, each seal mounting system 42, 44 may include an annular mounting bracket 92, 94, an annular support bracket 96, 98, a plurality of mounting spacers 100, 102 and a plurality of fasteners 104, 106, respectively. The mounting bracket 92, 94 may include a base 108, 110 that extends axially between a first mounting flange 112, 114 and a second mounting flange 116, 118, respectively. The first mounting flange 112, 114 may include a seal contact flange segment 120, 122 that extends radially from the base 108, 110 to an arcuate flange segment 124, 126, respectively. The seal contact flange segment 120, 122 includes a plurality of first fastener apertures 128, 130 that extend axially therethrough, respectively. The arcuate flange segment 124, 126 extends from the seal contact flange segment 120, 122 to a distal mounting flange end 132, 134, respectively. The second mounting flange 116, 118 connects to a respective one of the engine cases 12, 14.

The support bracket 96, 98 includes a base 136, 138 that extends radially between a first flange 140, 142 and a second flange 144, 146, respectively. The base 136, 138 includes a plurality of respective second fastener apertures 148, 150 that extend axially therethrough.

FIG. 8 is a cross-sectional illustration of one of the mounting spacers 100, 102. FIG. 9 is a sectional illustration of one of the mounting spacers 100, 102. Referring to FIGS. 8 and 9, each mounting spacer 100, 102 has a length 152 that extends axially between a first spacer end 154 and a second spacer end 156. The length 152 may be less than the first thickness 66 and/or the second thickness 70 (see FIG. 6). Each mounting spacer 100, 102 extends radially from a spacer bore 158 to an exterior spacer surface 160. The mounting spacers 100 and 102 may be constructed from a relatively incompressible material (e.g., metal).

During assembly of the flexible seal system 16 in FIG. 5, each of the mounting spacers 100 is arranged within a respective one of the mounting apertures 68. The first mounting segment 56 is located axially between the mounting bracket 92 and the support bracket 96. Each fastener 104 is inserted through a respective one of the first fastener apertures 128, the spacer bore 158 (see FIGS. 8 and 9) of a respective one of the mounting spacers 100, and a respective one of the second fastener apertures 148. Each fastener 104 may be tightened to a predetermined torque such that the respective mounting spacer 100 contacts and extends between the mounting bracket 92 and the support bracket 96. The first mounting segment 56 therefore may be compressed to a predetermined and repeatable first compression value, which is based on the predetermined torque and the difference between the first thickness 66 (see FIG. 6) and the length 152 (see FIG. 8).

Each of the mounting spacers 102 is arranged within a respective one of the mounting apertures 72. The second mounting segment 58 is located axially between the mounting bracket 94 and the support bracket 98. Each fastener 106 is inserted through a respective one of the first fastener apertures 130, the spacer bore 158 (see FIGS. 8 and 9) of a respective one of the mounting spacers 102, and a respective one of the second fastener apertures 150. Each fastener 106 may be tightened to a predetermined torque such that the respective mounting spacer 102 contacts and extends between the mounting bracket 94 and the support bracket 98. The second mounting segment 58 therefore may be compressed to a predetermined and repeatable second compression value, which is based on the predetermined torque and the difference between the second thickness 70 (see FIG. 6) and the length 152 (see FIG. 8). The second compression value may be equal to or different than the first compression value.

The reinforcement ring 46 is mounted circumferentially around the third seal segment 64.

In some embodiments, a plurality of layers of woven glass fibers are laid in a staggered configuration to provide each first region 74, 78 with its tapered geometry.

In some embodiments, the mounting spacers may extend into recesses in the respective mounting bracket and/or support bracket. Alternatively, the mounting spacers may extend through the respective mounting bracket and/or support bracket (e.g., between respective fastener heads and nuts).

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A flexible seal system for a gas turbine engine, comprising:
   an annular mounting bracket;
   an annular support bracket;
   an annular flexible seal extending axially between a first mounting segment and a second mounting segment, wherein the first mounting segment is connected axially between the mounting bracket and the support bracket, and comprises a plurality of mounting apertures that extend axially through the first mounting segment; and
   a plurality of mounting spacers, each arranged within a respective one of the mounting apertures, and extending axially between the mounting bracket and the support bracket;
   wherein the flexible seal is constructed from an elastomer composite that comprises a plurality of fibers, and wherein a quantity of the fibers are laid oblique to an axially extending contour line of the flexible seal.

2. The system of claim 1, wherein the first mounting segment is compressed between the mounting bracket and the support bracket.

3. The system of claim 1, wherein the flexible seal comprises an arcuate seal segment connected between the first mounting segment and the second mounting segment, and wherein the first mounting segment extends radially from an end of the flexible seal to the seal segment.

4. The system of claim 3, wherein the seal segment comprises a first region and a second region, and wherein the first region comprises a thickness that tapers as the first region extends from the first mounting segment to the second region.

5. The system of claim 1, wherein the flexible seal comprises a plurality of arcuate seal segments connected between the first mounting segment and the second mounting segment, wherein a first of the plurality of the seal segments extends from the first mounting segment, and wherein a second of the plurality of the seal segments extends from the second mounting segment.

6. The system of claim 5, wherein the first of the plurality of the seal segments extends radially outwards from the first mounting segment, wherein the second of the plurality of the seal segments extends radially outwards from the second mounting segment, and wherein a third of the plurality of the seal segments is connected between and extends radially inwards from the first of the plurality of the seal segments and the second of the plurality of the seal segments.

7. The system of claim 6, further comprising a reinforcement ring that circumferentially wraps around the third of the plurality of the seal segments.

8. The system of claim 1, wherein the mounting bracket comprises an arcuate flange segment that extends radially outwardly from a seal contact flange segment, and wherein the seal contact flange segment contacts the first mounting segment.

9. The system of claim 1, wherein the first mounting segment is connected between the mounting bracket and the support bracket by a plurality of fasteners, and wherein one of the fasteners extends axially through the mounting bracket, a respective one of the mounting spacers and the support bracket.

10. The system of claim 1, wherein a portion of the flexible seal that includes a first of the mounting apertures has an axial thickness, wherein a first of the mounting spacers is disposed within the first of the mounting apertures, and wherein the first of the mounting spacers has an axial length that is less than the axial thickness where the flexible seal is uncompressed.

11. The system of claim 10, wherein the axial length is equal to the axial thickness where the flexible seal is connected between the mounting bracket and the support bracket.

* * * * *